No. 859,840. PATENTED JULY 9, 1907.
R. H. READ.
ELECTRIC LIGHT ILLUMINANT.
APPLICATION FILED SEPT. 16, 1904.

WITNESSES:

INVENTOR,
Robert H. Read,
by Albert G. Davis
Atty.

UNITED STATES PATENT OFFICE.

ROBERT H. READ, OF SCHENECTADY, NEW YORK, ASSIGNOR TO GENERAL ELECTRIC COMPANY, A CORPORATION OF NEW YORK.

ELECTRIC-LIGHT ILLUMINANT.

No. 859,840.      Specification of Letters Patent.      Patented July 9, 1907.

Application filed September 16, 1904. Serial No. 224,648.

*To all whom it may concern:*

Be it known that I, ROBERT H. READ, a citizen of the United States, residing at Schenectady, in the county of Schenectady and State of New York, have invented certain new and useful Improvements in Electric-Light Illuminants, of which the following is a specification.

This invention relates to electric lighting, and its object is to provide a light-emitting element capable of yielding a brilliant white light with a high degree of efficiency. To this end, I construct the illuminant of magnesium carbid. This substance was first produced by Moissan in 1898, by acting on heated magnesium with a stream of acetylene (*Comptes Rendus*, Vol. 126, pp. 302–306), but so far as I am aware no one has heretofore discovered its advantages as an electric-light illuminant.

Figure 1:
Figure 2:
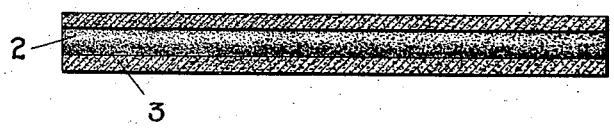
Figure 3:
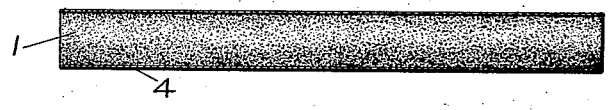

In the accompanying drawing, Figure 1 shows an electric-light illuminant made of magnesium carbid, in the form of an arc-light electrode; Fig. 2 is a longitudinal section of an electrode showing a carbon jacket or tube with a core of magnesium carbid; and Fig. 3 shows an electrode of magnesium carbid with a jacket or coating of metal.

The electrode shown in Fig. 1 is a cylindrical stick 1 of suitable length and diameter to be substituted for the ordinary carbon electrodes used in arc lamps. It is composed of magnesium carbid, which is first granulated and mixed with tar or other carbonaceous binder, and then molded in a powerful press. Powdered carbon or refractory oxids or metals may be mixed with the carbid before molding in order to facilitate the starting of the arc, or to modify the light. A conducting diluent such as carbon promotes a better action in an ordinary arc lamp in preventing mushrooming of the magnesia formed by combustion in air.

Instead of making the entire electrode of carbid, the latter may be used alone or mixed with carbonaceous or other materials as a core or filling for a tubular carbon electrode, as shown in Fig. 2, where the magnesium carbid core 2 is inclosed in the tubular carbon jacket 3; the latter being shown in section. If necessary, the electrode of magnesium carbid or a mixture containing the same may be incased in or plated with metal, as appears in Fig. 3, where such a jacket or coating is shown in section at 4.

When magnesium carbid is burned, a refractory oxid is left which may be removed from the electrode, when the arc is again struck, by imparting a wiping movement to the electrodes, or by striking the arc from a part of the electrode back of the top.

An electrode of the kind described may be used at both positive and negative sides or only one such be employed together with either carbon or metal electrodes. The arc produced gives the spectrum characteristic of magnesium and a larger proportion lies within the visible range of the spectrum than any other source of artificial light, thus greatly enhancing the luminous efficiency. A further advantage for electrode purposes of magnesium carbid arises from the fact that it is not readily decomposed by the moisture of the atmosphere.

What I claim as new and desire to secure by Letters Patent of the United States, is,

1. An arc-light electrode containing magnesium carbid.
2. An arc-light electrode containing magnesium carbid mixed with a diluent.
3. An arc-light electrode containing magnesium carbid mixed with a conducting diluent.
4. An arc-light electrode comprising a molded pencil containing magnesium carbid.
5. An arc light electrode consisting mainly of magnesium carbid.

In witness whereof, I have hereunto set my hand this fifteenth day of September A. D., 1904.

ROBERT H. READ.

Witnesses:
  BENJAMIN B. HULL,
  HELEN ORFORD.